United States Patent Office 2,729,538
Patented Jan. 3, 1956

2,729,538

PREVENTION OF NYLON GEL FORMATION

Donald R. Hull, Seaford, Del., assignor to E. I. du Pont de Nemours and Company, Wilmington, Del., a corporation of Delaware No Drawing. Application November 30, 1951, Serial No. 259,283

9 Claims. (Cl. 18—54)

This invention relates to the handling of molten superpolyamides, and relates more particularly to prevention of nylon gel formation at hot metal surfaces in contact with molten superpolyamides in such operations as melt-extrusion of polyamides to form filaments, fibers and films.

The basic method of making the fiber-forming polyamides and the fibers therefrom is described in detail in U. S. Patents 2,071,250, 2,071,253, 2,130,948 and 2,190,770 to W. H. Carothers. These fiber-forming polyamides are linear condensation products made by continued heating of bifunctional reactants under polymerizing conditions with removal of volatile material until a product is obtained suitable for preparing filaments which can be cold drawn into useful fibers showing X-ray examination orientation along the fiber axis. A valuable property of these superpolyamides is that they can be spun from melt by extruding the molten polymer through suitable orifices and cold drawing the filaments thus obtained. These fiber-forming polyamides are called superpolyamide. They may be made from a diamine and a dibasic acid or a polymerizable amino acid.

In the commercial process for producing filaments and fibers from superpolyamides, as described by Greenewalt in U. S. Patent No. 2,217,743 and by Waltz in United States Patent No. 2,571,975 (both assigned to the assignee of the present application), the polymer is melted on a heated grid in a melting chamber and then flows down into a heated reservoir chamber from which the pump meters a supply to the spinning orifices. In normal operation the reservoir may contain up to two to three hours' inventory of the molten polymer, depending upon the speed of spinning and the denier of the yarn spun. It has been found that thermal degradation occurs in the reservoir and on the grid, particularly at the stagnant polymer-metal boundaries, such that there occurs on these metal surfaces a layer of gelled polymer. This gelled polymer where it adheres to the interior wall or the grid builds up an effective insulating layer which adversely affects the rate of heat transfer into the molten mass. When this occurs on the melting surfaces, it eventually results in reducing the rate of melting below that at which the molten polymer is removed from the reservoir. Such an occurrence makes for the production of considerable quantities of uneven and low denier yarn which must be cut to waste. Accordingly, when this happens, the melting and spinning assembly must be removed from service for cleaning.

The reactions in the thermal degradation of superpolyamides are not thoroughly understood. It is possible that the thermal degradation produces a decomposition product which serves to form cross links between amide groups on adjacent polymer chains. The decomposition reaction proceeds slowly with time finally building up a three-dimensional network of molecules (which I will hereinafter call geled polymer), and which eventually reaches the stage where it is both insoluble in common polyamide solvents and infusible.

A serious difficulty which arises from the formation of these gelled polymer layers on the interior walls is that from time to time pieces break off and get into the flowing polymer stream where they produce damage to the spinning equipment. These fragments of gelled polymer plug the entrance port to the metering pump and effectively bring the spinning operation to a halt for lack of polymer flow to the pump. The gelled polymer sometimes enters the pump causing it to jam or, in other cases, causing it to become scored from a partial jamming action. If the fragments are small enough so that they pass through the pump, they collect on top of the filtering medium where they cause the back pressure of the filtering medium to build up to such an extent that the pump must labor against an unduly large head with resulting excessive wear to the parts. This increase in back pressure will also cause the molten polymer to slip back through the pump which results in smaller delivery of polymer per revolution of the pump and which in turn results in a smaller and off-standard spun denier. These high pressures may also deform the spinnerets or other pack parts and thus render them unfit for further use.

The greatest difficulty, however, is caused by gelled polymer which has progressed to the three-dimensional structural stage but which has not yet reached the stage of being infusible. This kind of gelled polymer exists in the uppermost portion of the layers which are adhering to the interior walls or to the grid, and is readily washed into the stream of flowing polymer. Being still molten or at least heat softened, it passes through the pump and even through the filter medium to show up either as physical discontinuities or as viscosity differences in the spun filaments. When these filaments are later cold drawn, these discontinuities and differences cause breaks in the filaments which either cause the whole thread to break or else go through to be counted as quality defects in the final yarn. Those discontinuities and differences which do not show up as broken filaments in the yarn can be the cause of differences in dyeing affinity and of lowered tenacity and decreased elongation when a working load is applied.

Another, and somewhat less serious disadvantage of the accumulation of gelled polymer on the interior walls of the melting and holding chamber and on the grid, is that during the course of the life of the melting and spinning assembly the inventory of molten polymer in the reservoir may vary from up to two or three hours down to just a few minutes supply. This means that the molten polymer is delivered to the spinning pump under different conditions of equilibrium and thermal degradation which can and do result in differences in such yarn properties as birefringence, dyeing affinity and viscosity.

In the melt casting of film these gelled polymer discontinuities and differences show up as variations in sheet thickness, as variations in transparency, and as colored specks.

It is an object of this invention to avoid the above difficulties by minimizing gel formation of the molten superpolyamide. Another object is to avoid accumulation of gelled polymer on the melting grid, on the walls of the reservoir, in the pump, or in the filtering medium when melt-spinning filaments, fibers and films of polyamide. A further object is to improve the uniformity and quality of filaments, fibers and films formed from the molten polymer. Other objects will become apparent from the disclosure and the appended claims.

The difficulties described above are obviated in accordance with the process of this invention by applying a coating of a polyorganosiloxane (which, in accordance with common usage, will henceforth be called a silicone coating) to any metal surfaces in contact with molten polyamides, such as melting surfaces of the grid and walls of the reservoir in which the molten polyamide accumulates before being metered to the orifices to be formed into filaments, fibers, and the like. I have made the surprising discovery that molten polyamides do not wet these silicone-coated surfaces and that the polymer flows freely from them. As a result, stagnant layers of polymer do not form and gel formation caused by overheating or prolonged heating is avoided. The coating need only be a continuous, adherent film of any silicone which is stable at the temperature involved (usually about 290° C.). Hence the silicone coating must be non-volatile at the temperature used and must not char or otherwise decompose (thermosetting reactions are not objectionable, of course). Any of the silicones which can be applied as stable coatings preferentially wet metal surfaces and are not wet by the molten polyamide. They may also be used for the same purpose on many other surfaces, such as enamel, glass or plastic.

The following examples are given to illustrate the improvement in the art of manufacturing polyamide structures which provides for supplying essentially gel-free polymer to the spinning system. The details set forth in the examples, however, are not to be considered as limitations of the invention. These examples illustrate that essentially no gelled polymer accumulates on the melting surfaces of the grid or on the interior walls of the reservoir if these surfaces are coated with silicone.

*Example 1*

The melting grid and the walls of the reservoir in a melting and spinning assembly for the production of nylon yarn as described by Greenewalt in U. S. Patent No. 2,217,743 were coated by spraying or dipping in a 10% tetrachloroethylene solution of a silicone grease (designated DC-4 by the manufacturer, the Dow Corning Company, and believed to be a straight chain high molecular weight dimethyl silicone) to give a thin but continuous film of silicone on these surfaces. The tetrachloroethylene solvent, of course, evaporated when the assembled unit was heated to the operating temperature of 290° C. Superpolyamide made from hexamethylene diammonium adipate was charged to the melting chamber in flake form through a lock to keep air out of the melting chamber. The flake polymer contacted the grid melter at 290° C., melted, and flowed down into the reservoir. The molten superpolyamide was then picked up by the metering pump, forced through the filtering medium and out through the spinneret orifices to become filaments which were subsequently quenched and wound up. This unit, after 30 days continuous operation, was torn down, taken apart, and examined. There was essentially no accumulation of gelled polymer on the interior walls of the reservoir or on the melting surfaces of the grid. A similar unit, which had not been coated with the silicone on the melting grid or on the walls of the reservoir, was taken apart and examined after operating the same length of time under the same conditions. In this case there was an accumulation of gelled polymer on the interior walls of the reservoir and on the grid which was $3/16$ inch thick in places.

*Example 2*

The melting grid and the walls of the reservoir in a melting and spinning assembly for the production of nylon yarn, of the type described by Waltz in United States Patent No. 2,571,975 were sprayed or swabbed with a liquid silicone (designated DC-200 by the Dow-Corning Company), having a viscosity of 100 centistokes and believed to be a straight chain, high molecular weight dimethyl silicone similar to the material used in Example 1, but possessing a somewhat lower molecular weight. The result was a thin continuous film of a silicone on the metallic surfaces involved. Polyhexamethylene adipamide in flake form, containing 2% $TiO_2$ and stabilized with N-aminopropyl morpholine, was charged to the melting chamber through an open feed pipe while maintaining an atmosphere of steam within the chamber. The flake polymer contacted the grid melter at 290° C., melted and flowed down into the reservoir. The molten superpolyamide was then picked up by the metering pump, forced through the filtering medium, and out through the spinneret orifices to become filaments which were subsequently quenched and wound up. This unit spun successfully in continuous operation for 41 days before being torn down voluntarily for inspection. Examination of the silicone-treated surfaces showed there to be little, if any accumulation of gelled polymer. Similar untreated units operating under the same conditions failed on the average after 10 days' spinning because of an accumulation of gelled polymer on the melting surfaces and on the walls of the reservoir.

*Example 3*

The melting surfaces and walls of the reservoir of an apparatus of the type described in Example 1 were sprayed with or dipped in a 10% dispersion in perchlorethylene of a thermosetting silicone to give a thin but continuous film of silicone on these surfaces. The dispersion was made by diluting 20 parts by volume of the 50% dispersion of the silicone resin in a mixed toluene-xylene solvent supplied by the manufacturer with 80 parts by volume of perchlorethylene. The silicone is designated DC-803 by the Dow-Corning Company and is believed to be a branched-chain methyl phenyl silicone which, on heating in the presence of air, cross-links through —Si—O—Si— linkages to form a 3-dimensional thermoset structure. The perchlorethylene solvent, of course, evaporated on heating to the operating temperature of 290° C., and the silicone was thermoset. During the operation of this silicone-treated apparatus for the production of filaments and fibers from molten superpolyamides, an almost complete absence of an accumulation of gel polymer on the interior walls of the reservoir and on the melting surfaces was observed as in Example 1.

*Example 4*

The melting surfaces and the walls of the reservoir of the apparatus described in Example 1, were either subjected to the vapors of Dry Film No. 9977 or sprayed with a 5% solution of Dry Film No. 9977 in benzene (Dry Film No. 9977 is manufactured by General Electric Company and is a chloromethylsilane composed principally of dichlorodimethylsilane). This chloromethylsilane, in contact with the metallic surfaces mentioned above, is hydrolyzed by the moisture normally adsorbed upon these metallic surfaces, with the result that the methylchlorosilane polymerizes in situ on these surfaces to give a polymethylsiloxane. The metallic surfaces bearing the silicone polymer were then exposed to ammonia vapors to neutralize the liberated hydrogen chloride and prevent corrosion of the metal. When the silicone-coated apparatus was used in the production of filaments and fibers from polyamides, as described in Example 1, there was found to be essentially no accumulation of gel polymer on these treated surfaces after a 30-day period of continuous operation. Similar equipment which had not been treated in any way showed an accumulation of $3/16''$ thick coating of gelled polymer.

It is to be understood that this invention is equally applicable to all hot metal surfaces which contact molten polyamide. It is therefore within the scope of this invention to coat the interior walls of autoclaves or other vessels or chambers in which molten polyamides are prepared, including pipes or other ducts through which molten polyamides are pumped or caused to flow by other means.

The silicones which are suitable for the purposes of this invention include those having straight chain structures represented by the general formula,

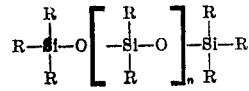

where $n$ is an integer somewhat greater than 1, and those having branched, cross-linked structures, indicated by the partial formulas,

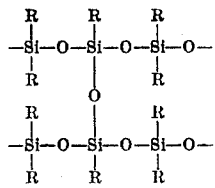

or

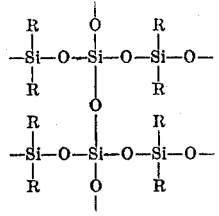

The R's indicated above represent organic radicals. When these R's are alkyl groups, the compounds are termed alkyl silicones; for example, when the R's are methyl the compound is a methyl silicone. When the R's are aromatic hydrocarbon radicals, the compounds are termed aryl silicones. These R's may be all the same or may be different depending upon the method of preparation. Furthermore, these R's may contain reactive groups or may be readily susceptible to oxidation, such that heating the silicone causes it to react further to form a more completely cross-linked structure which is insoluble and infusible, i. e., the silicone is thermoset.

It is not necessary to have a hard, solid silicone coating on the hot metal surfaces to provide the advantages of this invention. It is merely necessary that a continuous coating be obtained on these surfaces which is stable at the temperature involved. The coating can be liquid, solid, or of an intermediate consistency. It can even approach monomolecular thinness and still be effective. This is illustrated in Example 4 where the silicone coating was obtained by exposing the metal surfaces (merely containing adsorbed moisture) to the fumes of an organochlorosilane, which resulted in the formation in situ of an extremely thin layer of polyorganosiloxane on the metal.

Silicones may be applied in a liquid or greaselike form. They are preferably applied as a solution or colloidal dispersion in an appropriate solvent. They may be applied also as an aqueous emulsion, for example, of the oil-in-water type having a low viscosity in which the water predominates, or even as an emulsion of the water-in-oil type which is normally of a grease-like consistency. Both the solvent of the silicone solutions and the non-silicone phase of the emulsions are preferably volatile liquids, particularly at the temperatures that are employed in the practice of nylon spinning, so that the solvents are removed during the heat-up cycle for these units, leaving only the silicone film on the metal surfaces.

For reasons of simplicity, this invention has been specifically described in terms of polyhexamethylene adipamide, since that is the polymer used to produce the nylon yarn commonly available on the market. This invention, obviously, embraces the production of other synthetic linear superpolyamide yarns as well as related synthetic filaments. Related synthetic linear polymer yarns such as, for example, those derivable from polymerizable mono-amino carboxylic acids or their amide-forming derivatives, and those derived from the reaction of suitable diamines with suitable dicarboxylic acids or amide-forming derivatives of dibasic carboxylic acids, are thus included within the purview of this invention.

As many different embodiments of the present invention may be made without departing from the spirit and scope thereof it is to be understood that the invention is not limited to the specific embodiments disclosed except to the extent defined in the appended claims.

What is claimed is:

1. A process for forming a polyamide fiber which comprises coating with a silicone those internal surfaces of a melt spinning device which are ahead of the metering pump and which during conventional operation of the said spinning device contact molten polyamide, thereafter introducing molten polyamide, extruding the melt through an orifice and solidifying the extruded mass into a fiber.

2. The process of claim 1 wherein the silicone is a liquid.

3. The process of claim 1 wherein the silicone is a solid.

4. A process for forming a polyamide fiber which comprises coating with a silicone the melting grid and the melt reservoir walls of a melt spinning device, and thereafter introducing polyamide, melting the said polyamide, extruding the melt through an orifice and solidifying the extruded mass into a fiber.

5. The process of claim 4 wherein the silicone applied is a grease of dimethyl silicone in tetrachloroethylene solvent, the solvent being evaporated after application to the surfaces being coated.

6. The process of claim 4 wherein the silicone applied is liquid dimethyl silicone with a viscosity of about 100 centistokes.

7. The process of claim 4 wherein the silicone applied is a cross-linked, branched chain methyl phenyl silicone.

8. The process of claim 4 wherein the silicone is a polymethylsiloxane produced by hydrolysis of dichlorodimethylsilane.

9. A process for forming a polyamide fiber which comprises coating with a silicone those internal surfaces of a melt spinning device which are ahead of the metering pump and which present stagnant polymer-metal boundaries and thereafter introducing molten polyamide, extruding the melt through an orifice and solidifying the extruded mass into a fiber.

References Cited in the file of this patent

UNITED STATES PATENTS

| 2,403,476 | Berry et al. | July 9, 1946 |
| 2,462,242 | Webb et al. | Feb. 22, 1949 |
| 2,515,697 | Cresswell | July 18, 1950 |

FOREIGN PATENTS

| 951,684 | France | Nov. 2, 1949 |

OTHER REFERENCES

British Plastics, "Silicones" by L. Sanderson, October 1946, pages 459–464.